Patented Oct. 25, 1927.

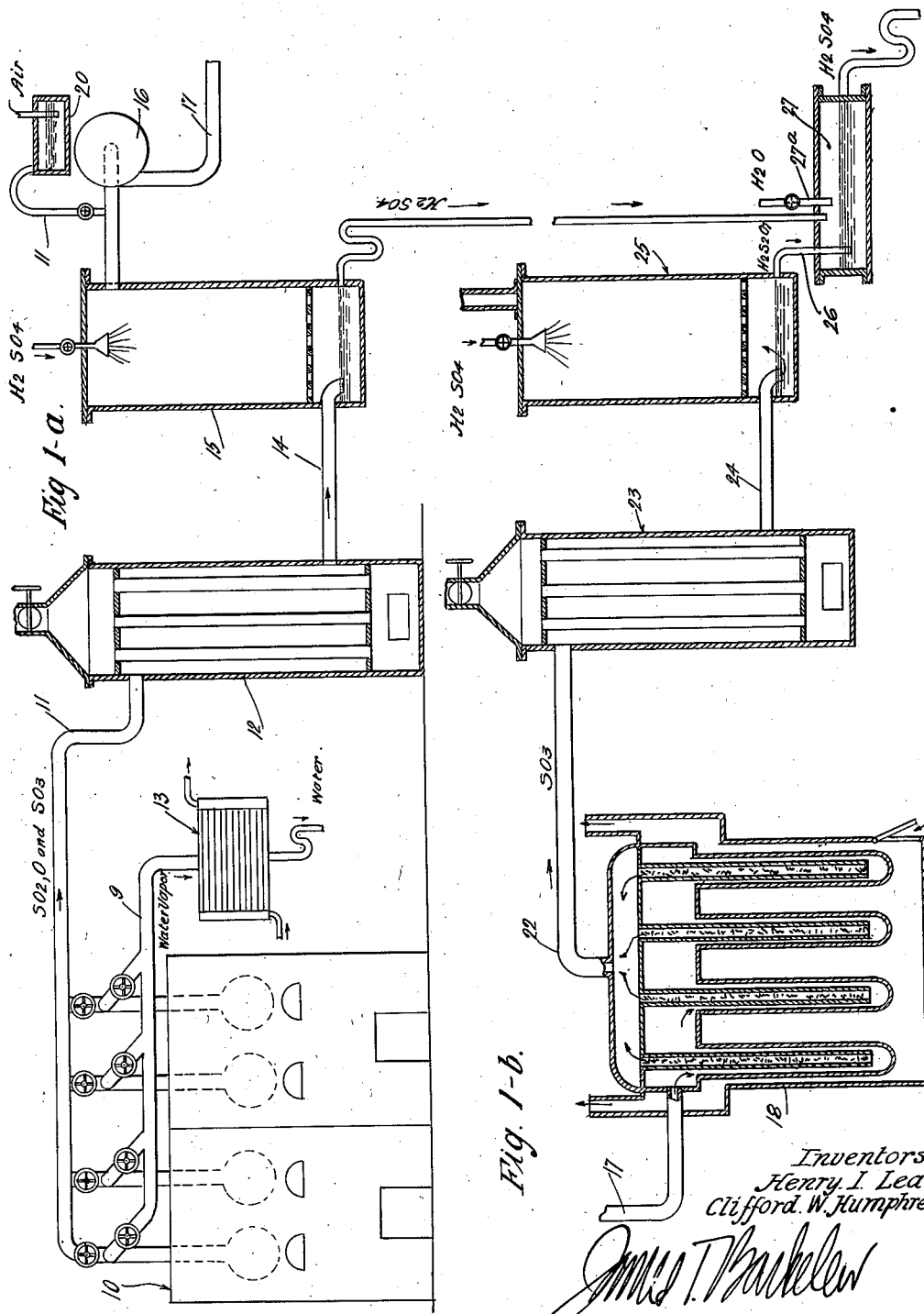

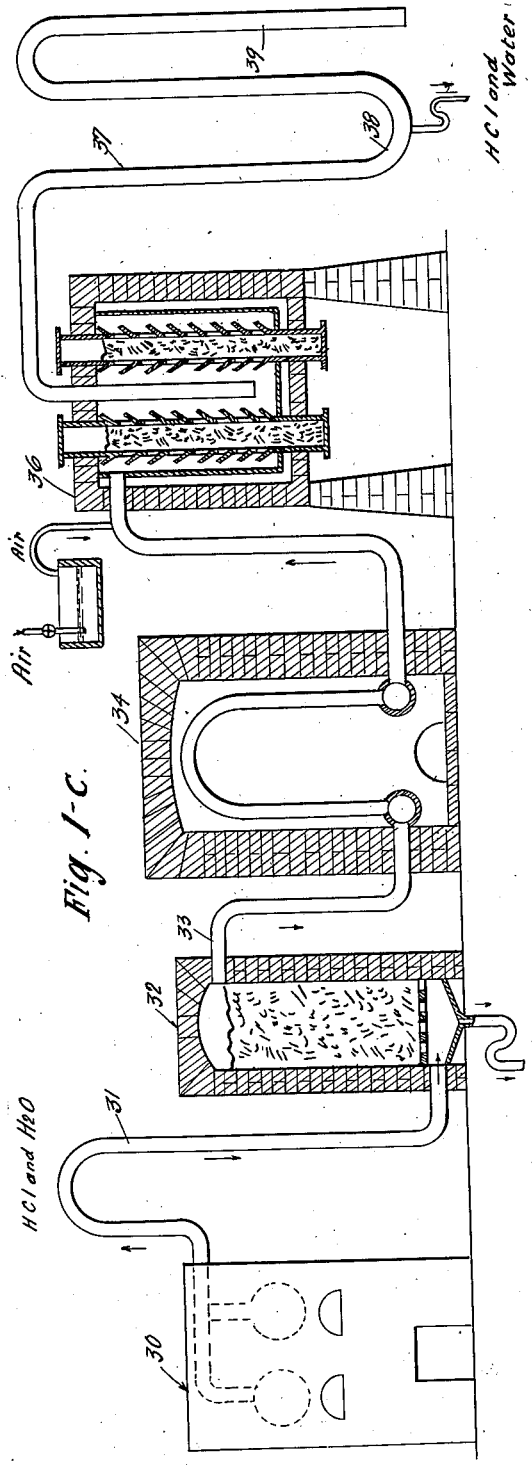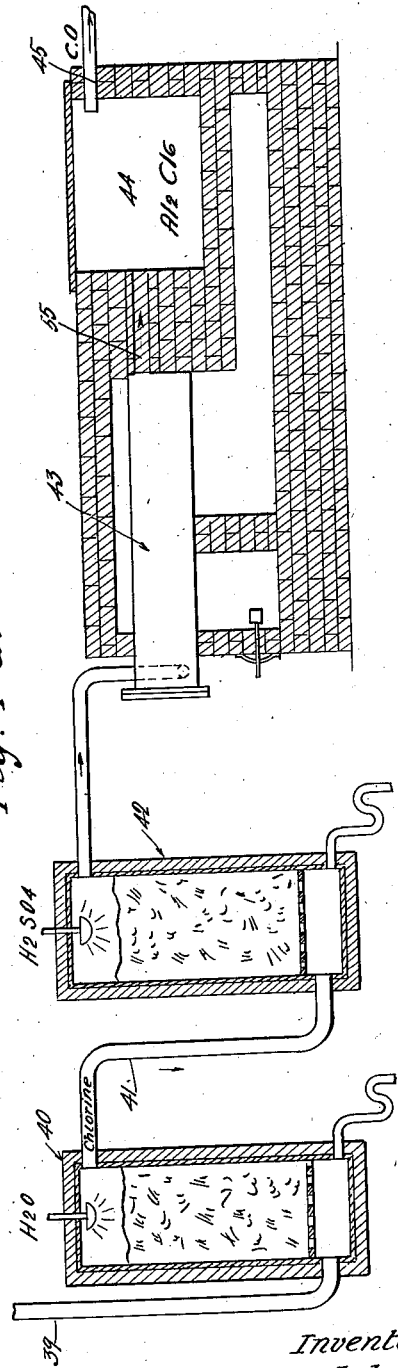

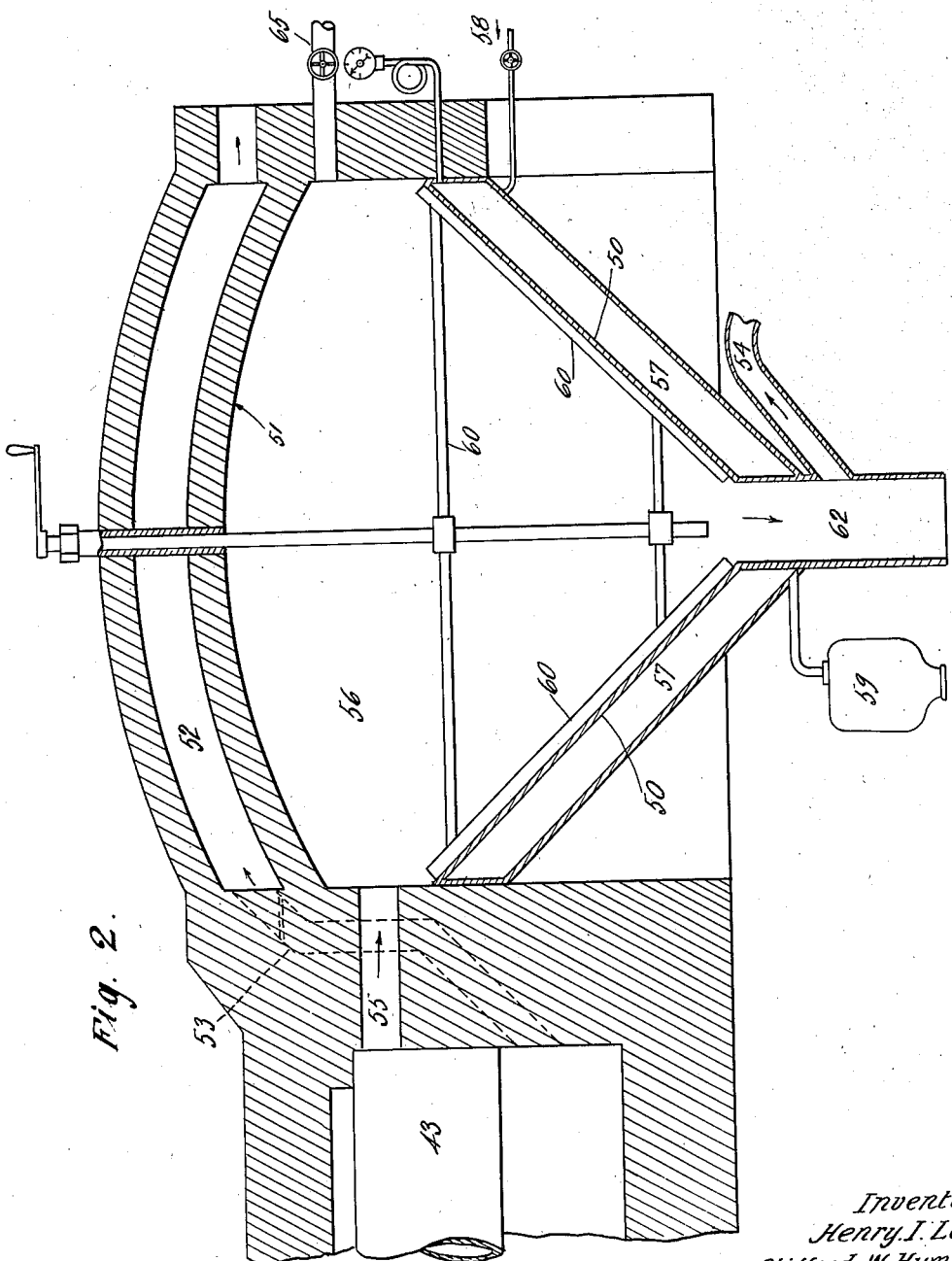

1,646,733

UNITED STATES PATENT OFFICE.

HENRY I. LEA, OF SANTA MONICA, CALIFORNIA, AND CLIFFORD W. HUMPHREY, OF RED BANK, NEW JERSEY.

ALUMINUM-CHLORIDE PROCESS.

Application filed June 20, 1923, Serial No. 646,559. Renewed March 16, 1927.

This invention relates to processes for the production principally of aluminum chloride. The present general object of the invention concerned in this application and in several co-pending and companion applications, hereinafter identified, is the economical production of anhydrous aluminum chloride (hereinafter referred to simply as aluminum chloride); but the process as hereinafter described also produces other products of some value. Consequently, although aluminum chloride is at present the most valuable product of the process, and although for that reason we term our process one for producing aluminum chloride, it is not to be understood that it may not be an object, or perhaps under other conditions the principal object, to produce one or more of the other products of the process.

There are various procedures differing somewhat from each other by which our process may be carried out; the process as a whole will be best understood from the following detailed descriptions of preferred methods, rather than from any general statement that we may make in advance. However, for the purpose of generally distinguishing the processes of the several applications from each other we will make a general and preliminary statement of the distinguishing features of the several variations. It will be understood nevertheless that this statement is not intended in the least as a restriction or limitation upon the invention either as a whole or as to the specific aspects herein claimed, but is intended only to give a clear idea of the lines of demarkation of the several specific deviations of the fundamental process and as between the specific claims of the several co-pending applications. This application is a continuation in part of our application on "aluminum chloride process" filed May 31st, 1922, Serial No. 564,762. In that application we have described a process including steps that may be said, in a broad way, to amount to the chlorination of a more or less dehydrated or more or less dehydrated and decomposed aluminum sulphate; and the specific variations in the methods have to do with the various ways and means of effecting successive operations, as for instance, the ways and means for obtaining the chlorine for the chlorination reaction, or the specific ways and means of treating the original aluminum sulphate, as to whether it is decomposed or not before being chlorinated.

When we refer herein to aluminum sulphate it will be understood that we include that substance in whatever form it may be used. For instance, it may be in ores that carry the sulphate in such state that the ores themselves may be put directly into our process; or it may be in ores that require pre-treatment to separate certain other matters; or it may be in ores that may be put directly into the process and that may require one or two additional steps during the process. Such for instance, is the ore alunite, an aluminum and potassium sulphate ore; and how such an ore may be treated is hereinafter set out.

A typical form of the general process may, for the purpose of this preliminary general statement, be described as follows:— We take an aluminum sulphate or an aluminum sulphate carrying ore, and if it has not been previously dehydrated, we first dehydrate it. Then by application of suitable temperature we decompose the sulphate into aluminum oxide and a sulphur and oxygen compound or compounds. For instance, the sulphur and oxygen may either come off as $SO_3$ and $SO_2$ and $O$. Then we chlorinate the oxide that we have obtained by decomposing the sulphate. This general aspect of the process is the subject matter of a copending companion application; also a continuation in part of said prior application, and that for purposes of identification we here term application "B", Serial No. 646,555, filed June 20, 1923. Just how and where the chlorine for chlorination is preferably obtained, during the steps of the process, is the particular subject matter of an application, which, in this series, is identified as application "C", Serial No. 646,556, filed June 20, 1923; and this will be adverted to later. The chlorination is carried out by subjecting the oxide, under suitable temperature, to the action of chlorine in the presence of carbon. The chlorine may be, and preferably is, in most variations of this process, free chlorine. But as we will set out the chlorination step may be carried on without the necessity of first obtaining free chlorine. This also will be spoken of later.

Whatever may be the immediate chlorinating agency, chlorination carried on in the presence of carbon is preferably carried on in the presence of hydrocarbons in the manner and with the resulting advantages as hereinafter explained. The process, in itself, of chlorinating an aluminum oxide or an aluminum oxide carrying ore, in the presence of hydrocarbons, or impregnated with hydrocarbons, is made the specific subject matter of the claims of said prior application Serial No. 564,762, filed May 31, 1922, which for identification will be called in this specification, application "A".

The chlorine for chlorination of the aluminum oxide produced by decomposition of the sulphate, is preferably obtained by using the sulphur and oxygen product of that decomposition to make hydrochloric acid; and this may be done, as an illustration, through the step of making sulphuric acid. These procedures are capable of some variations and are generally the characteristic subject matter of application "C" Serial No. 646,556, filed June 20, 1923.

Then, in the process where an SO compound or sulphuric acid is produced (as for instance, in the form of the process where the sulphate is decomposed as described in applications "B" and "C") the S and O compound, either directly or through the step of forming sulphuric acid, may be used either wholly or in part, to react upon some other aluminum compound, for instance, aluminum silicate, to produce more aluminum sulphate for the process. This may be very economically done, particularly where the sulphur and oxygen compound production is more than is required for the formation of the requisite amount of chlorinating agent. This variational feature of the process is the characteristic subject matter of companion application "D" Serial No. 646.557, filed June 20, 1923.

As another variation, the sulphate may be chlorinated directly without decomposition; and this is subject matter of companion application E Serial No. 646,558, filed June 20, 1923. And the sulphate may further be treated for decomposition, and the chlorinating agent also formed in what amounts to a single reaction, being in effect, a more or less complete summation of the several chlorinating agent forming reactions that are the characteristic subject matter of application "C". For instance, instead of first decomposing the sulphate by a separate decomposing operation and then utilizing the sulphur and oxygen compound to produce a chlorinating agent and then using that chlorinating agent to chlorinate the oxide; we may treat the sulphate directly with water and a chloride, under proper temperature conditions, resulting in the formation of aluminum oxide and hydrochloric acid or chlorine and a sulphate; and then the produced oxide may be chlorinated with the chlorinating agent. This last mentioned variation is the characteristic subject matter of the present application, identified in this series as application "F".

All of the applications, herein identified as B to F inclusive, are divisional continuations in part or in whole of said application A, Serial No. 546,762. Since these divisional applications relate more particularly to certain variational forms of the process as hereinabove generally set out, we will in the specifications endeavor only to set out the several subject matters necessary for the complete understanding of the respective claimed inventions and for an understanding of the connection of the several divisional processes with each other. Accordingly, this present application has its descriptive matter directed more particularly to the process that involves characteristically the decomposition of the sulphate to produce an oxide and to the more or less simultaneous production of a chlorination agent with which the oxide is then chlorinated.

As will be readily understood, our process may be carried on in any suitable apparatus; and so it is only for the purpose of clarifying the following detailed description that we illustrate a suitable apparatus in the accompanying drawings. In these drawings there is a diagram which, for convenience of illustration, is divided into several figures as Fig. 1$^a$, Fig. 1$^b$, Fig. 1$^c$, Fig. 1$^d$; and Fig. 2 is a section showing a form of chloride condensing chamber that may be used as herein explained.

In order to explain the various forms in which this particular process may be carried out, and the variations of which it is capable, we will first explain the general and typical form of processes which forms more particularly the subject matters of applications B, and C of this series.

In the method that we shall describe first and which may be hereinafter referred to as method No. 1, we take aluminum sulphate, and, placing it in a retort 10 heat it to a temperature sufficient to drive off its water of crystallization; so that we have the reaction;

I: $Al_2(SO_4)_3 18H_2O + heat =$
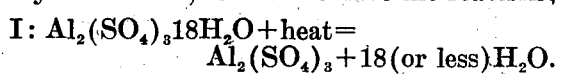
$Al_2(SO_4)_3 + 18 (\text{or less}) H_2O.$ We may say here that less than the maximum amount of water may be driven off, because the sulphate does not always contain the maximum amount; and also because it may be that this reaction, like others in the process may sometimes not go through to absolute completion. This will be generally understood in connection with all the following.

The product here is a dehydrated aluminum sulphate that may be removed from time to time or preferably left in the retort for the next decomposition reaction. The retorts 10 may be arranged singly, in pairs or more in a set so as to provide for more or less continuous operation. The water vapor that passes off goes through pipe 9 into condenser 13 or may go directly to atmosphere.

Further application of heat to the dehydrated sulphate then causes it to break up into aluminum oxide, sulphur dioxide and oxygen (or the aluminum oxide and sulphur trioxide, as hereinafter explained) as follows:

II: 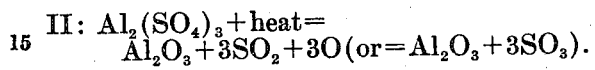

The temperature used for this reaction may vary; we have found that a red heat is suitable, and a dull red heat or even lower may be sufficient (say about 600° C. or above). The temperature used depends on time element, the pressure (above or below atmosphere) maintained in the retort, and the extent of decomposition desired. We find that absolutely full decomposition is not necessary or practically desired.

The sulphur dioxide and oxygen from this operation pass through the pipe 11 to the cooler 12, which may be here an air or water cooler. The oxide may be removed from time to time to be put in the chlorinating retort; or chlorination, as hereafter explained, may be carried on in retorts 10.

Next the gases pass through pipe 14 to a drying and cleaning tower 15 of any suitable kind, through which the gases rise upwardly and through which sulphuric acid, or other drying medium, may be sprayed down from the top; and the gases next are drawn out by an exhauster 16 and passed through a pipe 17 into a catalyzer 18. At the same time this exhauster draws in atmospheric air through a valve controlled pipe 19, the air passing through a washer 20, to cleanse and dry it. Catalyzer 18 is preferably of the type utilizing platinized asbestos. In this catalyzer the uncombined sulphur dioxide and oxygen are combined to form sulphur trioxide according to:

III: 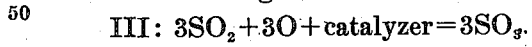

The oxygen theoretically required for this reaction may be fully supplied by the oxygen from the last preceding reaction; but we find that an excess of oxygen (supplied here by the air) makes the reaction go on more fully.

The catalyzer may be kept at the most efficient temperature with air that passes through its air jacket 21; and the heated air that comes off the catalyzer may be used at any convenient place in the process, for instance, for combustion under one or more of the retorts. We find the best catalyzer temperature to be about 450° C.; it may be necessary in starting to warm the catalyzer, and then, when in operation, to somewhat cool it to maintain this temperature.

From the catalyzer 18 the sulphur trioxide passes through pipe 22 to another cooler 23 which may be either air or water cooled. We may state here that wherever a cooler is used in this process it may be desirable to use an air cooler as we thereby can more readily use the heat in the furnaces. From the cooler the sulphur trioxide passes through pipe 24 into an absorption tower 25. In the absorption tower the gases pass upwardly and sulphuric acid is sprayed downwardly; with the result that fuming sulphuric acid is formed, and this sulphuric acid collecting in the bottom of the tower passes out through pipe 26 into a storage chamber 27 to which water may be controllably fed through 27ᵃ to change the fuming sulphuric into ordinary sulphuric of 66° B. gravity.

These reactions are thus represented: (if they go to completion)

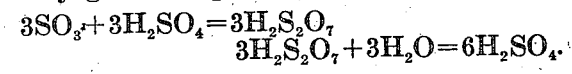

Half this sulphuric acid is put back into absorption tower 25, thus leaving half the sulphuric acid ($3H_2SO_4$) in 27. Thus the summation of these two reactions may be written:

IV: 

If conditions in retort 10 have been such as to produce $SO_3$ instead of $SO_2$ and $O$, or to partially produce $SO_3$, then that $SO_3$ will, with sulphuric acid in 15, become $H_2S_2O_7$. If $SO_3$ is produced entirely in retort 10, then catalyzer 18 and cooler 23 and absorption tower 25 can be dispensed with; the $H_2S_2O_7$ going directly from 15 to 27.

Then into a retort or salt cake pan 30 that is heated to about the same temperature as the first retort we introduce an alkali chloride, for instance sodium chloride, and the sulphuric acid, in proper proportions for the following reaction which then takes place:

V: 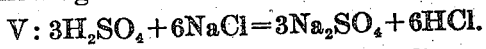

In this operation the chloride of sodium, potassium, calcium, magnesium or manganese may be used. If we use sodium chloride the result of this operation is to produce sodium sulphate and hydrochloric acid. The sodium sulphate is left in the retorts until the charge is exhausted while the hydrochloric acid gas passes through pipe 31 into a drying chamber 32. This drying chamber may be of brick construction, filled with coke. The dried hydrochloric acid vapor then passes through pipe 33 into a heater 34. This heater may be heated with waste gases from the retorts. Then the dry heated HCl gas passes through pipe 35 to the second catalyzer 36 charged with broken brick, coke, pumice stone, or other suitable material well soaked with a solution of $CuCl_2$ or other suitable catalyzing material. This catalyzer 36 is kept at a temperature of about 450° C., and also there is supplied to this catalyzer a suitable amount of air or oxygen so that the following takes place;

VI: 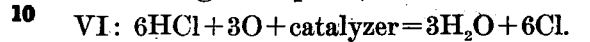 $6HCl + 3O + catalyzer = 3H_2O + 6Cl$.

The vapors and gases pass off through a pipe 37 which has a condensation bend 38 where the water is condensed and any remaining HCl is thus taken off in solution and then the chlorine gas passes through pipe 39 into a tower 40. This is a wooden tower lined with lead and filled with coke, and sprayed with water to cleanse the gases and absorb any remaining HCl. Thence the gases pass through pipe 41 into a similar tower 42 which is sprayed with sulphuric acid to dry the gases. Thence the gases are lead to a retort 43 which is heated by any suitable means to a temperature of about red heat, (say about 600° C. or more). And into this retort is also introduced carbon and the $Al_2O_3$ that has been produced in retorts 10 when the dehydrated aluminum sulphate has been broken up by heat. The carbon and $Al_2O_3$ are ground and thoroughly mixed to give intimate contact and briquetted if found desirable to prevent being carried over mechanically into the condensing chamber. The following reaction then takes place:

VII: 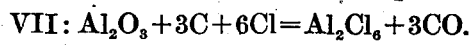 $Al_2O_3 + 3C + 6Cl = Al_2Cl_6 + 3CO$.

The result is the production of carbon monoxide gas and anhydrous aluminum chloride in vapor form. This aluminum chloride as fume passes into a sublimating chamber 44 where the aluminum chloride sublimes and the carbon monoxide passes off through a pipe 45. This carbon monoxide may be used, for instance, as fuel in any of the various furnaces.

It may be desirable to control the temperature of the aluminum chloride so as to control its final physical form; and in Fig. 2 we have shown one form of apparatus suitable for that purpose. The chloride vapors from retort 43 enter a chamber 56 through pipe 55. This chamber has a brick top 51 heated by a heating jacket 52 receiving waste gases from combustion under the retort, and whose temperature may be controlled by any suitable damper arrangement, for instance. The conical bottom 50 of chamber 56 is steam jacketed at 57, steam (or other vapor) being admitted at 58 and exhausted through a trap at 59. By controlling the pressure any selected temperature may be maintained at the conical floor of chamber 56. A revoluble scraper 60 serves to scrape the chloride off floor 50 to drop through outlet 62 into receiver 63. The residual gases (CO) pass out through 14. Cool inert gases (for instance, CO or N) may be introduced at 65. The various operations follow:

(a) Pass cool gas through 52, air cool the jacket 57 and introduce cool gas at 65, and then all or practically all the chloride will be sublimated in finely divided form.

(b) Heat top of chamber so that inside temperature is above the boiling point of the chloride, which is about 183° C. Floor 50 is maintained slightly below the melting point (178° C.); and then the major portion of the chloride will be thrown down as a crystal.

The device above described also forms one means for obtaining fractional condensation separation of certain final products of certain methods herein described. For instance, where aluminum chloride and certain sulphur compounds are final products, they may be at least partially separated by maintaining the proper temperature in the chamber, its roof and floor; or, of course, they may be separated in any of the well known frictional condensation systems.

Summing up this method it will be seen that we use as initial materials aluminum sulphate or sulphate bearing ores, etc. (Equation I); sodium chloride (Equation V); and carbon (Equation VII). The ultimate products are sodium sulphate (Equation V); aluminum chloride (Equation VII); and carbon monoxide (Equation VII). The ultimate thing that is done is the chlorination of the oxide obtained by dehydrating and decomposing aluminum sulphate. In the particular procedure described we obtain the chlorine for the chlorination from hydrochloric acid which in turn is formed from sulphuric acid and sodium chloride, and the sulphuric acid is formed from the sulphur dioxide and oxygen (and/or $SO_3$) that are driven off when the aluminum sulphate is reduced to aluminum oxide; and these particular things, with their variations, form more particularly the subject matter of application "C", herein above identified. However, as such variations may form a part of the process as practically carried out, we mention typical ones.

Generally speaking, we find that as our process involves the chlorination of aluminum oxide obtained by decomposition of dehydrated aluminum sulphate, we can carry on the operations at much lower temperature than any other process of which we are aware; and we find also that such decomposed sulphate lends itself very readily to easy chlorination. It will be understood that in all forms of our process, anhydrous aluminum sulphate may be the starting point of our actual operations; the sulphate may be dehydrated previously.

We may say here, that in the operation of retorts 30 we may arrange and connect them so that the gases are passed through several in series, one cylinder being always disconnected from the series line to remove spent material and to charge a fresh. The fresh cylinder is then connected into first position in the line. In this way almost complete reactions may be obtained.

*Methods in which the sulphate is decomposed simultaneously with the production of the chlorinating agent.*

One of the methods that form more particularly the specific subject matter of this application involves the same first step as before described, that is, the dehydration of the aluminum sulphate by heat. The second step in this method however, involves putting the undecomposed aluminum sulphate directly into reaction with a chloride, and this may be done either with or without the presence of water. If water is used one of the results of this step is to produce hydrochloric acid. If water is not used chlorine is directly produced. We may use in this reaction any of the suitable chlorides; and thus if we use sodium chloride, and if water is used, the reaction is as follows:

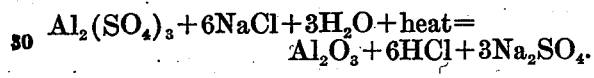

$$Al_2(SO_4)_3 + 6NaCl + 3H_2O + \text{heat} = Al_2O_3 + 6HCl + 3Na_2SO_4.$$

It will be unnecessary to give reaction equations using other chlorides as they will be readily understood.

This reaction step may be carried out in a retort such as those previously described, heated to about the temperature hereinbefore stated, that is, to a temperature of about 600° C. or more. The aluminum oxide and the sodium or other sulphate are separated by lixiviation and the oxide then re-dried, preparatory to being chlorinated.

In this form of the process, producing hydrochloric acid, the last two steps may be the same as hereinbefore stated; that is, a reaction to produce chlorine from the hydrochloric acid, and then the chlorinating reaction using the chlorine to chlorinate the produced oxide.

If water is not used in the oxide producing reaction then we may have the following typical reaction:

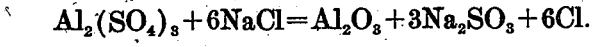

$$Al_2(SO_4)_3 + 6NaCl = Al_2O_3 + 3Na_2SO_3 + 6Cl.$$

In this case the reaction is not always complete and the chlorine and sulphur vapors must be separated either by absorption or by compression at low temperature. The aluminum oxide is leached out of the mass of sodium sulphite and the oxide then dried and then chlorinated in accordance with the chlorination step as before described. Any deficiency of chlorine may be supplied from an outside source. Where an aluminum sulphate ore is used insufficient hydrochloric acid or chlorine may be obtained from the above reactions and the supply must be augmented by chlorine or hydrochloric acid secured from other sources. Hydrochloric acid may be secured by heating sodium or other chloride in a salt cake furnace, with sulphuric acid or chloride may be manufactured or either the acid or chlorine may be obtained from other sources.

In any of these processes a natural occurring ore may be substituted for the aluminum sulphate, after treatment to free it of other ingredients and to reduce it to aluminum sulphate or substantially to aluminum sulphate. Or, for instance, certain sulphate ores may be put through a more or less special process similar to those above explained. For instance, alunite may be used. This ore may be described as a sulphate of aluminum and potassium, and it may be treated in the retort in admixture with a chloride, say potassium chloride, and in the presence of water (steam) to form aluminum oxide, potassium sulphate and hydrochloric acid. The potassium sulphate may be separated from the oxide by lixiviation and the oxide then dried to go into the chlorinating reaction. By regulating the amount of $H_2O$, the hydrochloric acid can be taken off largely in gaseous state, so that on drying it may be taken directly, as before explained, to the hydrochloric acid catalyzer and there, in reaction with air or oxygen, caused to form chlorine and water.

Or, by omitting the water in the foregoing reaction, and by first having thoroughly dried both the alunite ore and the chloride, then free chlorine results, in a certain amount, from this reaction instead of hydrochloric acid. Sulphur dioxide also results from this last operation and it may be separated out by absorption or liquefaction and then the sulphur dioxide may be used for making more chlorine as before explained.

We have explained in the said prior application how some or all of the sulphur oxygen content of the sulphate or ores, when driven off in the decomposing reaction, may be used to produce more sulphate for the process. This particular aspect of our process, including also the production directly of more aluminum oxide for the process is the peculiar subject matter of identified application "D"; but there is one feature of that process that is similar to the specific process and methods herein set out, and that forms specific subject matter of this present application. In using the sulphur oxygen content to produce more aluminum oxide for the process, there is a reaction wherein an aluminum sulphate is decomposed to produce aluminum oxide simultaneously with the production of the chlorinating agent. Generally speaking, in said application "D" we have explained how the sulphur oxygen content may be used to react on any aluminum silicate or aluminum bearing ore suitable for making aluminum sulphate, to produce aluminum sulphate; but this will not need particular description here. But, in using the sulphur oxygen content, either wholly or partly, to produce more aluminum compound for chlorination, we may go one step further, and instead of producing aluminum sulphate, we may directly produce the aluminum oxide and simultaneously produce the chlorinating agent. This may be done at a single operation, using some or all of the sulphur oxygen content, as follows:—

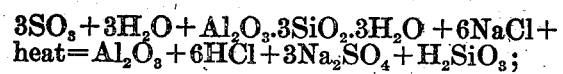

or, $3SO_2 + 3O$ may be used in place of $3SO_3$ with the same results as above. Or, if the sulphur oxygen content is first put into sulphuric acid (as has been hereinbefore explained in the general process) then the operation is

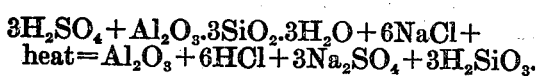

These equations are given on the assumption that an ordinary clay and sodium chloride are used. Any similar aluminum bearing ore or any suitable chloride may of course be used as will be readily understood. These operations may be carried out in the retorts at substantially the same temperatures as before specified. The aluminum oxide produced is separated by leaching from the resulting product; and then of course the aluminum oxide is dried before being put through the chlorination step.

It will be seen that in this particular variation of the process, just as in those before given, we have an operation in which an aluminum ore is broken down to aluminum oxide and the chlorinating agent is produced in the same operation.

It will be understood that, although we have here now stated various forms of process, that we have given these various forms by way of illustration only; and that the process may be varied in other manners and still be within the scope of the invention as expressed in the subjoined claims. For instance, various combinations or arrangements of the various steps herein set out may be made by selecting certain steps from the one or more of the methods herein stated and certain other steps from one or more of other methods herein stated; but it is unnecessary and would be burdensome to specifically state all of the possible methods that might be thus worked out.

Having described a preferred form of our inventions, we claim:

1. A process that includes treating dehydrated aluminum sulphate with a chloride under heat to form aluminum oxide and a chlorinating agent, and then chlorinating the aluminum oxide with said chlorinating agent.

2. A process that includes treating dehydrated aluminum sulphate with a chloride and water under heat to form aluminum oxide and hydrochloric acid, then chlorinating the oxide with chlorine obtained from the hydrochloric acid.

3. A process that includes partially dehydrating aluminum sulphate, then causing it to react with a chloride to form aluminum oxide, HCl and a sulphate, separating the oxide and sulphate and chlorinating the oxide with chlorine made from the HCl.

4. A process that includes dehydrating aluminum sulphate, forming hydrochloric acid and aluminum oxide by reactions between the dehydrated aluminum sulphate and water and a chloride; and chlorinating the aluminum oxide with chlorine produced from the hydrochloric acid, to form anhydrous aluminum chloride.

In witness that we claim the foregoing we have hereunto subscribed our names this 7th day of June, 1923.

HENRY I. LEA.
CLIFFORD W. HUMPHREY.